March 4, 1969  K. J. MACK  3,431,157
METHOD OF BONDING GLASS FIBER REINFORCED PLASTIC
PANELS TO OTHER MATERIALS
Filed Dec. 20, 1965

INVENTOR.
Kenneth J. Mack
BY
Peter P. Kozak
ATTORNEY

United States Patent Office 3,431,157
Patented Mar. 4, 1969

3,431,157
METHOD OF BONDING GLASS FIBER REINFORCED PLASTIC PANELS TO OTHER MATERIALS
Kenneth J. Mack, Rochester, Minn., assignor to General Motors Corporation, Detroit, Mich., a corporation of Delaware
Filed Dec. 20, 1965, Ser. No. 514,893
U.S. Cl. 156—82                 12 Claims
Int. Cl. B32d 27/36, 31/20

This invention relates to a method for bonding glass fiber reinforced plastic panels or parts to other parts and has particular utility in the manufacture of glass fiber reinforced plastic vehicle bodies, boat hulls, furniture and the like.

The manufacture of plastic automobile bodies often requires a joining or bonding of various plastic fixtures, attachments, and the like to a surface of a cured glass fiber reinforced plastic panel. Bonding a fixture or attachment to a cured glass fiber reinforced polyester panel is presently formed by applying a layer of catalyzed, room temperature curing thermosetting polyester resin adhesive onto a suitably treated surface of the panel and pressing the fixture against the adhesive coated panel until the adhesive has been cured. Since polyester resin adhesives do not adhere satisfactorily to the smooth surface of a cured glass fiber reinforced polyester resin panel, it is necessary to prepare or treat the surface of the panel so that these adhesives will adhere satisfactorily to it. A method frequently used in preparing the surface of glass fiber reinforced plastic panels is sandblasting. Sandblasting removes both the resin and the glass fiber strands leaving a rough resinous surface to which the polyester adhesive resin will adhere. Sandblasting methods are expensive and create a serious dust hazard.

It is an object of this invention to provide a simple and inexpensive method for bonding cured glass fiber reinforced plastic panels to other parts with a polyester resin adhesive.

This and other objects are accomplished by a method in which the glass fiber reinforced polyester panel is subjected to a flame treatment whereby a layer of the polyester resin is burned away from the surface leaving an irregular surface of exposed glass fiber strands to which polyester resin adhesive readily adheres. A thin layer of polyester resin adhesive is applied on top of the exposed glass fiber strands and the other part is pressed against the thin adhesive layer until the adhesive layer is cured. The cured polyester resin adhesive tightly bonds the cured glass fiber reinforced polyester panel to the other part.

Further objects and advantages of the present invention will be apparent from the following detailed description, reference being had to the drawings wherein a preferred embodiment of the present invention is clearly shown.

Figure 1:
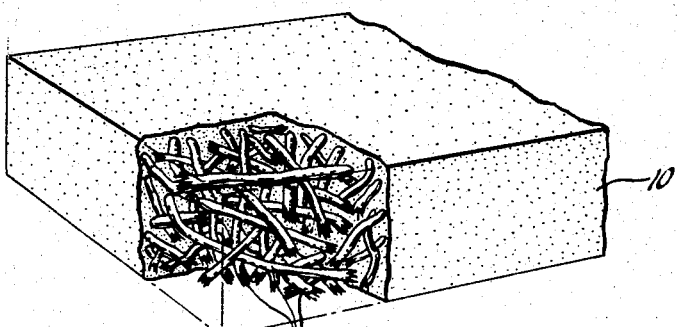
FIGURE 1 is a perspective view of a glass fiber reinforced polyester panel showing the reinforcing glass fiber.

Referring now to the drawings, FIGURE 1 is a perspective view of a glass fiber reinforced polyester panel 10 showing the glass fiber strands 12. The polyester resin used for plastic glass fiber reinforced automobile panels and the like is formed typically by reacting a dibasic acid with a dihydric alcohol. Examples of dibasic acids which may be used are phthalic acid, adipic acid, azelate acid, and isophthalic acid. Examples of dihydric alcohols which may be used are ethylene glycol, propylene glycol, 2,3 butylene glycol, diethylene glycol and dipropylene glycol. The polyester resin formed by reacting a dibasic acid with a dihydric alcohol may be cured in the presence of a monomer such as styrene to form a cured plastic panel. The glass fiber strands 12 vary in length and have a random arrangement in the resin panel. The surface of the glass fiber reinforced polyester panel 10 is essentially a smooth resinous one. As mentioned earlier, a cured, smooth resinous surface will not bond properly with polyester resin adhesive.

Figure 2:
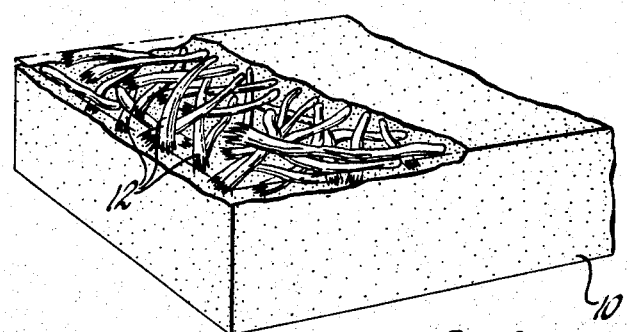
FIGURE 2 is a view similar to FIGURE 1 showing a glass fiber reinforced polyester panel having a flame treated surface.

In the practice of this invention, a first step consists of burning a layer of the resin away from the surface of the panel 10 leaving the exposed glass fiber 12 as shown in FIGURE 2. The resin is burned away from the surface with a conventional welding torch operated on an oxygen-acetylene gas mixture. The glass fiber strands are practically unaffected by the flame and maintain their relative position in the panel. The flame from the torch is directed at the faying edge, that is, the portion of the panel surface where the attachment is to be bonded. An oxygen-acetylene flame positioned 3 inches away from the panel will burn a sufficient amount of resin away from the glass fiber strands at the rate of 6 to 8 feet per minute. The rate of flame treating will vary with the size of the faying edge, the depth the resin is burned away, and the type of gas which is burned. Panels which have had the resin burned away to a depth of 0.10 to 0.60 inch provide a sufficient amount of exposed glass fiber strands to make a good bonding surface for the polyester resin adhesive. Gases other than an oxygen-acetylene mixture may be used in the torch. A low pressure natural gas will work successfully; however, it requires a longer treatment time since the natural gas flame is not as hot as the oxygen-acetylene flame. An oxygen-natural gas mixture may also be used. An advantage of using this flame method is that the degree of treatment, that is, the burning away of the resin, is not critical and the danger of overtreating is small. Even though the flame burns completely through the panel leaving only the glass fiber strands remaining, this can be easily repaired with the adhesive resin. The high temperature is not detrimental to the resin that is not burned away since it has been determined that the bond strength of a bond on a flame treated panel is similar to bonds on panels treated by other methods.

A relatively thin layer of the polyester resin adhesive which is sufficiently thick enough to cover the exposed glass fibers is applied on the flame treated portion of the panel. After the adhesive is applied to the exposed glass fiber, the fixture or attachment is then pressed down on top of the adhesive until the adhesive cures. The conventional practice is to use a suitable jig for holding the resulting construction in assembled relationship until the adhesive cures. A polyester resin adhesive is used primarily because it is inexpensive and easy to use on large scale production applications. The following adhesive formulation works effectively: 100 parts by weight polyester resin, 4 parts by weight benzoyl peroxide, 2 parts by weight an N-N-dimethylaniline and 65 parts by weight asbestos filler. This adhesive is in the form of a thick homogeneous liquid mixture. The polyester resin used in adhesive formulation is formed by reacting a dibasic acid such as phthalic acid with a dihydric alcohol such as ethylene glycol. Benzoyl peroxide is an initiator which is used in concentrations ranging from 0.2 to 10 percent by weight. Any diaryl peroxide, such as 4,4' dichlorobenzoyl peroxide, 4,4' dibromobenzoyl peroxide, 4,4' dimethoxybenzoyl peroxide, 4,4' paramethylbenzoyl peroxide, 3,3', 4,4' tetrachlorobenzoyl peroxide and the like may be used as the initiator. N-N-diethylaniline is used as the accelerator in this formulation. Other tertiary aromatic amines which may be used as accelerators with benzoyl peroxide are N-N-dimethyl-m-toluidine, N-N-dimethyl-p-toluidine, N-N-dimethylaniline and the like. The concentration of the tertiary aromatic amine ranges from 0.2 to 10 percent by weight. Asbestos is used as the filler in this adhesive. Other materials such as barium sulfate, aluminum powder, talc, and the like may be used as fillers. The concentration of the filler may be varied considerably. When the polyester resin adhesive cures, the fixture or attachment is tightly bonded to the glass fiber reinforced panel due to the polyester adhesive tightly gripping the exposed glass fiber strands.

Figure 3:
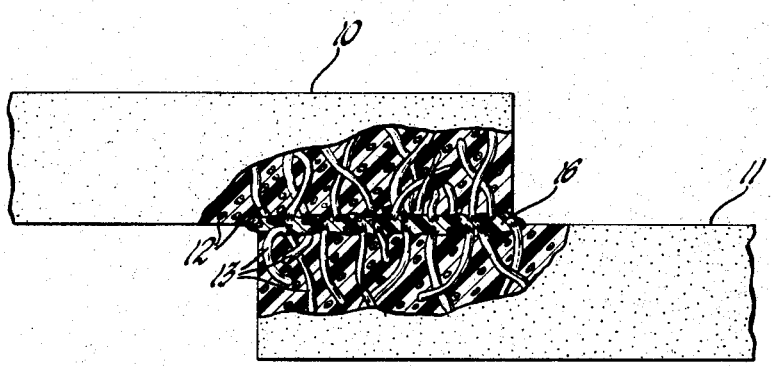
FIGURE 3 is a cross sectional view of two glass fiber reinforced polyester panels bonded together by a polyester adhesive resin.

Frequently, it is desirable to bond two glass fiber reinforced panels to each other, such as is shown in the cross sectional view in FIGURE 3. In such a case, the bonding surface or faying edge of each panel is flame treated so that a glass fiber strand area is available for the adhesive to adhere to. As before, the polyester resin adhesive is applied to one of the exposed glass fiber strand surfaces. The exposed glass fiber surface on the other panel is placed against the adhesive and held there by means of a jig. The glass fiber panel 10 is bonded to the glass fiber panel 11 by the polyester resin adhesive 16 which adheres tightly to the exposed glass fiber strands 12 of panel 10 and the exposed glass fiber strands 13 of panel 11.

While the invention has been described in terms of a preferred embodiment, it is to be understood that it is not limited thereby except as defined in the following claims.

I claim:
1. A method for bonding a cured glass fiber reinforced plastic panel to other materials comprising the steps of burning away the surface layer of plastic from the surface of the plastic panel portion to be joined, said burning step exposing glass fibers which adhere well to adhesives, applying a layer of an adhesive to the exposed glass fibers, pressing said other material which adheres well to adhesives on top of said adhesive layer, and curing said adhesive layer, said cured adhesive layer adhering tightly to said panel and said other material.

2. A method as described in claim 1 wherein said plastic in said glass fiber reinforced plastic panel is a polyester resin.

3. A method as described in claim 1 wherein said adhesive is a polyester resin adhesive.

4. A method as described in claim 1 wherein said surface is burned by an oxygen-acetylene flame.

5. A method as described in claim 1 wherein said surface is burned by a natural gas flame.

6. A method as described in claim 1 wherein said surface is burned by an oxygen-natural gas flame.

7. A method for bonding cured glass fiber reinforced plastic panels to each other comprising the steps of burning away the surface layer of plastic from the surface of the plastic panel portions to be joined, said burning step exposing glass fibers which adhere well to adhesives, applying a layer of an adhesive to the exposed glass fibers on one of said panels, pressing the exposed glass fiber portion of the other panel on top of said adhesive layer, and curing said adhesive layer, said cured adhesive layer adhering tightly to both plastic panels.

8. A method as described in claim 7 wherein said plastic in said glass fiber reinforced plastic panels is a polyester resin.

9. A method as described in claim 7 wherein said adhesive is a polyester resin adhesive.

10. A method as described in claim 7 wherein said surface is burned by an oxygen-acetylene flame.

11. A method as described in claim 7 wherein said surface is burned by a natural gas flame.

12. A method as described in claim 7 wherein said surface is burned by an oxygen-natural gas flame.

References Cited

UNITED STATES PATENTS

| 3,051,597 | 8/1962 | Bushong et al. | 156—82 XR |
| 2,477,407 | 7/1949 | Grant et al. | 156—62.8 XR |
| 3,141,809 | 7/1964 | Di Maio et al. | 156—182 XR |
| 2,700,633 | 1/1955 | Bovenkerk | 156—82 |
| 3,085,919 | 4/1963 | Clark | 156—62.8 XR |

PHILIP DIER, *Primary Examiner.*

U.S. Cl. X.R.

156—62.8, 182, 306, 322; 161—85, 93